US012790476B2

(12) United States Patent
Gkourmpis et al.

(10) Patent No.: US 12,790,476 B2
(45) Date of Patent: Nov. 10, 2026

(54) POLYPROPYLENE COMPOSITION FOR CABLE INSULATION

(71) Applicant: BOREALIS AG, Vienna (AT)

(72) Inventors: Thomas Gkourmpis, Stenungsund (SE); Katja Klimke, Linz (AT); Per-Ola Hagstrand, Stenungsund (SE); Ulf Nilsson, Stenungsund (AT); Lars Efraimsson, Stenungsund (AT); Anette Johansson, Stenungsund (SE)

(73) Assignee: BOREALIS AG, Vienna (AT)

( * ) Notice: Subject to any disclaimer, the term of this patent is extended or adjusted under 35 U.S.C. 154(b) by 512 days.

(21) Appl. No.: 18/549,717

(22) PCT Filed: Mar. 23, 2022

(86) PCT No.: PCT/EP2022/057564
§ 371 (c)(1),
(2) Date: Sep. 8, 2023

(87) PCT Pub. No.: WO2022/200395
PCT Pub. Date: Sep. 29, 2022

(65) Prior Publication Data

US 2024/0199865 A1 Jun. 20, 2024

(30) Foreign Application Priority Data

Mar. 25, 2021 (EP) .................................... 21164942

(51) Int. Cl.
*C08L 23/14* (2006.01)
*C08K 5/1575* (2006.01)
*H01B 3/44* (2006.01)

(52) U.S. Cl.
CPC .......... *C08L 23/142* (2013.01); *C08K 5/1575* (2013.01); *H01B 3/441* (2013.01); *C08L 2203/202* (2013.01); *C08L 2205/025* (2013.01); *C08L 2205/24* (2013.01); *C08L 2207/02* (2013.01)

(58) Field of Classification Search
CPC ...... C08L 23/142; C08K 5/1575; H01B 3/441
See application file for complete search history.

(56) References Cited

U.S. PATENT DOCUMENTS

| | | | | |
|---|---|---|---|---|
| 5,234,879 | A | 8/1993 | Garoff et al. | |
| 10,519,306 | B2 | 12/2019 | Wang et al. | |
| 2010/0282492 | A1* | 11/2010 | Machl | C08L 23/10 174/120 SR |
| 2017/0009068 | A1* | 1/2017 | Kahlen | C08K 5/0083 |

FOREIGN PATENT DOCUMENTS

| | | | | |
|---|---|---|---|---|
| CN | 102365324 | A | 2/2012 | |
| CN | 106414594 | A | 2/2017 | |
| EP | 0491566 | B1 | 9/1992 | |
| EP | 0591224 | B1 | 4/1994 | |
| EP | 0586390 | B1 | 5/1997 | |
| EP | 0887379 | B1 | 12/1998 | |
| EP | 2072576 | B1 | 6/2009 | |
| EP | 2739679 | B1 | 6/2014 | |
| EP | 2602367 | B1 | 5/2015 | |
| EP | 3506323 | A1 | 7/2019 | |
| EP | 3741806 | A1 * | 11/2020 | C08L 23/12 |
| KR | 2018-0137305 | A | 2/2019 | |
| KR | 1957049 | B1 | 3/2019 | |
| RU | 2657872 | C1 | 6/2018 | |
| WO | 1992/19653 | A1 | 11/1992 | |
| WO | 1992/19658 | A1 | 11/1992 | |
| WO | 99/24478 | A1 | 5/1999 | |
| WO | 99/24479 | A1 | 5/1999 | |
| WO | 1999/33843 | A1 | 7/1999 | |
| WO | 00/68315 | A1 | 11/2000 | |
| WO | 2003/000754 | A1 | 1/2003 | |
| WO | 2003/000757 | A1 | 1/2003 | |
| WO | 2004/000899 | A1 | 12/2003 | |
| WO | 2004/111095 | A1 | 12/2004 | |
| WO | 2006/097497 | A1 | 9/2006 | |
| WO | 2011/076780 | A1 | 6/2011 | |
| WO | 2013/007650 | A1 | 1/2013 | |
| WO | 2013/092620 | A1 | 6/2013 | |
| WO | 2015/091839 | A1 | 6/2015 | |
| WO | 2015/113907 | A1 | 8/2015 | |

OTHER PUBLICATIONS

Gurmeet Singh, et al., "Triad sequence determination of ethylene-propylene copolymers—application of quantitative 13C NMR" Polymer Testing 28 (2009) 475-479.
H.N. Cheng, "13C NMR Analysis of Ethylene-Propylene Rubbers", Macromolecules 1984, 17, 1950-1955.
Kakugo, Masahori, et al., 13C NMR Determination of Monomer Sequence Distribution in Ethylene-Propylene Copolymers Prepared with d-TiC13-Al(C2H5)2Cl.
Resconi, Luigi, et al. "Selectivity in Propene Polymerization with Metallocene Catalysts" Chem Rev. 2000, 100, 1253-1345.

(Continued)

*Primary Examiner* — John E Uselding

(74) *Attorney, Agent, or Firm* — Tarolli, Sundheim, Covell & Tummino LLP

(57) ABSTRACT

A polypropylene composition comprising (A) a copolymer of propylene and comonomer units selected from ethylene and alpha-olefins having from 4 to 12 carbon atoms with a total amount of comonomer units of from 10.0 to 16.0 wt %, and (B) an alpha-nucleating agent; wherein the polypropylene composition has a xylene cold soluble (XCS) fraction in a total amount of from 25.0 to 50.0 wt %, with an amount of comonomer units of at least 23.0 wt %, a melt flow rate MFR2 of from 0.5 to 5.0 g/10 min, and a flexural modulus of not more than 470 MPa, and an article comprising the polypropylene composition.

16 Claims, No Drawings

(56) References Cited

OTHER PUBLICATIONS

Vincent Busico, et al., "Alk-1-ene Polymerization in the Presence of a Monocyclopentadienyl Zirconium(IV) Acetamidinate Catalyst: Microstructural and Mechanistic Insights", Macromol. Rapid Commun. 2007, 28, 1128-1134.
Vincent Busico, et al., "Full Assignment of the 13C NMR Spectra of Regioregular Polypropylenes: Methyl and Methylene Region", Macromolecules 1997, 30, 6251-6263.
Vincent Busico, et al., "Microstructure of polypropylene" Prog. Polym. Sci 26 (2001) 443-533.
Wen-Jun Wang, et al., "Structural Analysis of Ethylene/Propylene Copolymers Synthesized with a Constrained Geometry Catalyst" Macromolecules 2000, 33, 1157-1162.
Zhe Zhou, et al., "A new decoupling method for accurate quantification of polyethylene copolymer composition and triad sequence distribution with 13C NMR" Journal of Magnetic Resonance 187 (2007) 225-233.
Zweifel, Hans, Plastics Additives Handbook, 5th Edition, 2001, 956-965.
European Application No. 21164942.1, Extended Search Report dated Sep. 1, 2021.
J. Randall, Macromol. Chem Phys. 1989, C29, 201_NPL.
1 Chinese Application No. 202280020354.5, Decision to Grant dated Jul. 21, 2025.
1 Korean Application No. 10-2023-7034599, Office Action dated May 22, 2025.
Russian Application No. 2023125804/04, Search Report, 2024.
Basov N.I. et al. Quality control of polymer materials. Edited by V.A. Braginsky, 2nd ed., reprint, Leningrad, Publishing House "Chemistry", 1990.
Bychuk M.A. Preparation and properties of polymer films based on poly-3-hydroxybutyrate and polycaprolactone thesis for a Candidate Degree in Technical Sciences, Moscow, 2016.
Russian Application No. 2023125804/04, Office Action dated Aug. 23, 2024.
Chinese Application No. 202280020354.5, Office Action dated Mar. 11, 2025.
Korean Application No. 10-2023-7034599, Decision to Grant dated Jan. 28, 2026.

* cited by examiner

POLYPROPYLENE COMPOSITION FOR CABLE INSULATION

The present invention relates to a flexible polypropylene composition, an article comprising said polypropylene composition, preferably a cable comprising an insulation layer comprising said polypropylene composition and the use of said polypropylene composition as cable insulation for medium and high voltage cables.

TECHNICAL BACKGROUND

Nowadays, ethylene polymer products are used as insulation and semiconducting shields for low, medium and high voltage cables, due to easy processability and their beneficial electrical properties. In addition, in low voltage applications polyvinyl chloride (PVC) is also commonly used as insulation material, usually in combination with softeners to reach desirable softness of cables. PVC is a thermoplastic which by incorporation of various plasticizers can be used in a wide temperature range. For standard PVC a continuous conductor temperature of max. 70° C. is normal. At low temperatures PVC becomes rigid and usage temperatures below −10° C. should be avoided. At conductor temperatures over 100° C. the plasticizers migrate out and the materials lose their flexibility. However, with the addition of special plasticizers and stabilizers, PVC materials can be produced for conductor temperatures of 90-105° C. But in essence, PVC is mainly used for the 1 kV area, as the higher permittivity of the material means that the losses increase too much at higher voltages and therefore PVC cables are not normally not used over 1 kV. In addition, softeners have to be added to PVC in order to maintain a high level of flexibility. Insufficient amounts of softeners reduce low temperature properties of PVC significantly. From an environmental point of view, these softeners are not always regarded as problem-free, making them desirable to eliminate.

Especially for medium, high and extra high voltage (MV, HV and EHV) cables as well as high-voltage direct current (HVDC) cables insulation material presently is dominated by crosslinked ethylene polymer (XLPE) products. These products have a high operating temperature, a high electric breakdown strength and good mechanical properties. However, due to its crosslinking the XLPE is not recyclable by remelting. Therefore, attempts were made to use thermoplastic material and especially thermoplastic propylene polymers as insulation material for medium, high and extra high voltage (MV, HV and EHV) cables as well as high-voltage direct current (HVDC) cables. Further, power network owners are developing an increasing interest for cables that are recyclable by remelting.

Thus, there is an increasing interest in polymer compositions based on thermoplastic propylene polymers for insulation layers of medium voltage (MV), high voltage (HV), extra high voltage (EHV) and high-voltage direct current (HVDC) cables. Thereby, the propylene polymers need to show a good balance of properties as regards flexibility, mechanical properties, impact properties and electrical breakdown strength.

Thus, there is a need in the art for polypropylene compositions suitable for cable insulation and shows a good balance of properties as regards flexibility, mechanical properties, impact properties and electric breakdown strength.

SUMMARY OF THE INVENTION

In one aspect the present invention relates to a polypropylene composition comprising (A) a copolymer of propylene and comonomer units selected from ethylene and alpha-olefins having from 4 to 12 carbon atoms with a total amount of comonomer units of from 10.0 to 16.0 wt %, preferably from 10.5 to 15.0 wt %, most preferably from 11.0 to 14.0 wt %, based on the total amount of monomer units in the polypropylene composition, and (B) an alpha-nucleating agent;

wherein the polypropylene composition has a xylene cold soluble (XCS) fraction in a total amount of from 25.0 to 50.0 wt %, preferably from 27.5 to 45.0 wt %, more preferably from 30.0 to 42.5 wt % and most preferably from 32.5 to 41.0 wt %, based on the total weight amount of the polypropylene composition, with an amount of comonomer units of at least 23.0 wt %, such as 23.0 to 35.0 wt %, preferably from 23.5 to 32.5 wt % and most preferably from 24.0 wt % to 30.0 wt %, based on the total amount of monomer units in the xylene cold soluble (XCS) fraction, a melt flow rate $MFR_2$ of from 0.5 to 5.0 g/10 min, preferably from 0.8 to 4.5 g/10 min, still more preferably from 1.0 to 4.3 g/10 min and most preferably from 1.2 to 4.0 g/10 min, and a flexural modulus of not more than 470 MPa, such as from 200 to 470 MPa, preferably from 250 to 450 MPa and most preferably from 300 to 430 MPa.

In another aspect the present invention relates to an article comprising the polypropylene composition as described above or below.

Preferably said article is a cable comprising an insulation layer comprising the polypropylene composition as described above or below.

In yet another aspect the present invention relates to the use of the polypropylene composition as described above or below as cable insulation for medium and high voltage cables.

Definitions

A heterophasic polypropylene is a propylene-based copolymer with a semi-crystalline matrix phase, which can be a propylene homopolymer or a random copolymer of propylene and at least one alpha-olefin comonomer, and an elastomeric phase dispersed therein. The elastomeric phase can be a propylene copolymer with a high amount of comonomer, which is not randomly distributed in the polymer chain but are distributed in a comonomer-rich block structure and a propylene-rich block structure.

A heterophasic polypropylene usually differentiates from a one-phasic propylene copolymer in that it shows two distinct glass transition temperatures Tg which are attributed to the matrix phase and the elastomeric phase.

A propylene homopolymer is a polymer, which essentially consists of propylene monomer units. Due to impurities especially during commercial polymerization processes a propylene homopolymer can comprise up to 0.1 mol % comonomer units, preferably up to 0.05 mol % comonomer units and most preferably up to 0.01 mol % comonomer units.

A propylene random copolymer is a copolymer of propylene monomer units and comonomer units in which the comonomer units are distributed randomly over the polypropylene chain. Thereby, a propylene random copolymer includes a fraction, which is insoluble in xylene—xylene cold insoluble (XCI) fraction—in an amount of at least 85 wt %, most preferably of at least 88 wt %, based on the total amount of propylene random copolymer. Accordingly, the propylene random copolymer does not contain an elastomeric polymer phase dispersed therein.

Usually, a propylene polymer comprising at least two propylene polymer fractions (components), which have been produced under different polymerization conditions resulting in different (weight average) molecular weights and/or different comonomer contents for the fractions, preferably produced by polymerizing in multiple polymerization stages with different polymerization conditions, is referred to as "multimodal". The prefix "multi" relates to the number of different polymer fractions the propylene polymer is consisting of. As an example of multimodal propylene polymer, a propylene polymer consisting of two fractions only is called "bimodal", whereas a propylene polymer consisting of three fractions only is called "trimodal".

A unimodal propylene polymer only consists of one fraction. Thereby, the term "different" means that the propylene polymer fractions differ from each other in at least one property, preferably in the weight average molecular weight—which can also be measured in different melt flow rates of the fractions—or comonomer content or both.

"Functionalized" means herein a chemical modification, preferably grafting or copolymerising with a mono- or polycarboxylic compound or a derivative of a mono- or polycarboxylic compound to provide the desired functional groups.

Vis-breaking is a post reactor chemical process for modifying semi-crystalline polymers such as propylene polymers. During the vis-breaking process, the propylene polymer backbone is degraded, for example by means of peroxides, such as organic peroxides, via beta scission. The degradation is generally used for increasing the melt flow rate and narrowing the molecular weight distribution.

In the following amounts are given in % by weight (wt %) unless it is stated otherwise.

DETAILED DESCRIPTION OF THE INVENTION

Polypropylene Composition

In one aspect the present invention relates to a polypropylene composition comprising (A) a copolymer of propylene and comonomer units selected from ethylene and alpha-olefins having from 4 to 12 carbon atoms with a total amount of comonomer units of from 10.0 to 16.0 wt %, preferably from 10.5 to 15.0 wt %, most preferably from 11.0 to 14.0 wt %, based on the total amount of monomer units in the polypropylene composition, and (B) an alpha-nucleating agent;

wherein the polypropylene composition has a xylene cold soluble (XCS) fraction in a total amount of from 25.0 to 50.0 wt %, preferably from 27.5 to 45.0 wt %, more preferably from 30.0 to 42.5 wt % and most preferably from 32.5 to 41.0 wt %, based on the total weight amount of the polypropylene composition, with an amount of comonomer units of at least 23.0 wt %, such as 23.0 to 35.0 wt %, preferably from 23.5 to 32.5 wt % and most preferably from 24.0 wt % to 30.0 wt %, based on the total amount of monomer units in the xylene cold soluble (XCS) fraction, a melt flow rate $MFR_2$ of from 0.5 to 5.0 g/10 min, preferably from 0.8 to 4.5 g/10 min, still more preferably from 1.0 to 4.3 g/10 min and most preferably from 1.2 to 4.0 g/10 min, and a flexural modulus of not more than 470 MPa, such as from 200 to 470 MPa, preferably from 250 to 450 MPa and most preferably from 300 to 430 MPa.

The polypropylene composition comprises an alpha-nucleating agent (B). The alpha-nucleating agent (B) thereby is not counted to the optional additives as described herein.

Preferably, the polypropylene composition contains from 0.000001 to 5.00 wt %, more preferably from 0.00001 to 2.50 wt % of the alpha-nucleating agent (B), based on the total amount of the polypropylene composition.

The amount of pure alpha-nucleating agent (B) in the polypropylene composition (without optional carrier polymer of a master batch) is preferably in the range of from 0.01 to 6000 ppm, more preferably from 0.1 to 5000 ppm, based on the total amount of the polypropylene composition.

The alpha-nucleating agent (B) is preferably selected from soluble alpha-nucleating agents and particulate alpha-nucleating agents. The alpha-nucleating agent (B) is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, and (iii) salts of diesters of phosphoric acid, e.g. sodium 2,2'-methylenebis(4,6-di-tertbutylphenyl) phosphate or aluminium-hydroxy-bis[2,2'-methylene-bis(4,6-di-tbutylphenyl)phosphate], and (iv) vinylcycloalkane polymer and vinylalkane polymer (as discussed in more detail below), and (v) mixtures thereof.

The alpha-nucleating agent is preferably selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, vinylcycloalkane polymer, vinylalkane polymer, and mixtures thereof.

Especially preferred are vinylcycloalkane polymers such as e.g. vinylcyclohexane (VCH) polymers. Such polymers can be added e.g. using Borealis Nucleation Technology (BNT).

The alpha-nucleating agent (B) can be added to the polypropylene composition as an isolated raw material or in a mixture with a carrier polymer, i.e. in a so-called master batch. The amount of the carrier polymer of the master batch thereby is calculated to the amount of the alpha-nucleating agent.

It has surprisingly been found that a polypropylene composition as defined above comprising the alpha-nucleating agent (B), preferably in amounts as described above or below show improved electric breakdown strength behaviour, especially the Weibull-beta parameter.

The polypropylene composition preferably comprises the copolymer of propylene and comonomer units selected from ethylene and alpha-olefins having from 4 to 12 carbon atoms (A) in an amount of from 90.0 to 99.999999 wt %, more preferably from 92.5 to 99.9 wt % and most preferably from 95.0 to 99.8 wt %, based on the total amount of the polypropylene composition.

The polypropylene composition can further comprise polymeric components which are different from the copolymer of propylene and comonomer units selected from ethylene and alpha-olefins having from 4 to 12 carbon atoms (A) in an amount of preferably 0.0 to 10.0 wt % based on the total amount of the polypropylene composition.

In one embodiment the polymeric components of the polypropylene composition consist of the copolymer of propylene and comonomer units selected from ethylene and alpha-olefins having from 4 to 12 carbon atoms.

In another embodiment the polypropylene composition comprises a polyolefin functionalized with a mono- or polycarboxylic acid compound or a derivative of a mono- or polycarboxylic acid compound, wherein the functionalized polyolefin is different from the copolymer of propylene and comonomer units selected from ethylene and alpha-olefins having from 4 to 12 carbon atoms.

The mono- or polycarboxylic acid compound or derivative of a mono- or polycarboxylic acid compound of the functionalized polyolefin is preferably selected from anhydrides of a mono- or polycarboxylic acid, whereby said anhydrides of a mono- or polycarboxylic acid can be linear or cyclic.

The functionalized polyolefin preferably is an acid anhydride functionalized polyolefin, more preferably a maleic anhydride (MAH) functionalized polyolefin, still more preferably a maleic anhydride (MAH) functionalized polypropylene or polyethylene, even more preferably a maleic anhydride (MAH) functionalized polypropylene, most preferably a maleic anhydride (MAH) grafted polypropylene, wherein the polypropylene is selected from homopolymers of propylene, random copolymers of propylene or heterophasic copolymers of propylene.

The functionalized polyolefin preferably has a high melt flow rate $MFR_2$ of from 100 to 750 g/10 min, more preferably from 150 to 500 g/10 min, measured at a load of 2.16 kg and a temperature of 230° ° C. according to ISO 1133. Further, the functionalized polyolefin preferably has a peal melting temperature of from 140 to 180° C., more preferably from 145 to 170° ° C.

The functionalized polyolefin preferably is commercially available e.g. from ExxonMobil under the trade name Exxelor PO, such as e.g. Exxelor PO 1020.

In said embodiment the functionalized polyolefin is preferably present in the polypropylene composition in an amount of from 0.5 to 3.0 wt %, preferably from 0.7 to 2.5 wt %, most preferably from 0.9 to 2.0 wt %, based on the total weight amount of the polypropylene composition.

Besides these polymeric components and the alpha-nucleating agent (B) the polypropylene composition can comprise one or more additives in an amount of from 0.0 up to 5.0 wt %, based on the total amount of the polypropylene composition. The one or more additives are preferably selected from acid scavengers, antioxidants, beta nucleating agents, etc. Such additives are commercially available and for example described in "Plastic Additives Handbook", $6^{th}$ edition 2009 of Hans Zweifel (pages 1141 to 1190).

Usually, these additives are added in quantities of 1 to 50000 ppm for each single component.

The one or more additives can be added to the polymeric components in a blending step.

Thereby, the one or more additives can be added to the polymeric components in form of master batches in which one or more additives are blended with a carrier polymer in concentrated amounts. Any optional carrier polymer is calculated to the amount of additives, based on the total amount of the propylene copolymer composition.

The term "beta-nucleating agent" refers to any nucleating agent which is suitable for inducing crystallisation of propylene polymers in the hexagonal or pseudohexagonal modification. Mixtures of such nucleating agents may also be employed. Suitable types of beta-nucleating agents are (i) dicarboxylic acid derivative type diamide compounds from C5-C8-cycloalkyl monoamines or C6-C12-aromatic monoamines and C5-C8-aliphatic, C5-C8-cycloaliphatic or C6-C12-aromatic dicarboxylic acids, e.g. N,N'-di-C5-C8-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide, N,N'-di-C5-C8-cycloalkyl-4,4-biphenyldicarboxamide compounds such as N,N'-dicyclohexyl-4,4-biphenyldicarboxamide and N,N'-dicyclopentyl-4,4-biphenyldicarboxamide, N,N'-di-C5-C8-cycloalkyl-terephthalamide compounds such as N,N'-dicyclohexylterephthalamide and N,N'-dicyclopentylterephthalamide, N,N'-di-C5-C8-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide, (ii) diamine derivative type diamide compounds from C5-C8-cycloalkyl monocarboxylic acids or C6-C12-aromatic monocarboxylic acids and C5-C8-cycloaliphatic or C6-C12-aromatic diamines, e.g. N,N'-C6-C12-arylene-bis-benzamide compounds such as N,N'-p-phenylene-bis-benzamide and N,N'-1,5-naphthalene-bis-benzamide, N,N'-C5-C8-cycloalkyl-bis-benzamide compounds such as N,N'-1,4-cyclopentane-bis-benzamide and N,N'-1,4-cyclohexane-bis-benzamide, N,N'-p-C6-C12-arylene-bis-C5-C8-cycloalkylcarboxamide compounds such as N,N'-1,5-naphthalene-bis-cyclohexanecarboxamide and N,N'-1,4-phenylene-bis-cyclohexanecarboxamide, and N,N'-C5-C8-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide, (iii) amino acid derivative type diamide compounds from amidation reaction of C5-C8-alkyl, C5-C8-cycloalkyl- or C6-C12-arylamino acids, C5-C8-alkyl-, C5-C8-cycloalkyl- or C6-C12-aromatic monocarboxylic acid chlorides and C5-C8-alkyl-, C5-C8-cycloalkyl- or C6-C12-aromatic mono-amines, e.g. N-phenyl-5-(N-benzoylamino)pentane amide and N-cyclohexyl-4-(N-cyclohexyl-carbonylamino)benzamide.

Further suitable beta-nucleating agents are (iv) quinacridone type compounds, e.g. 5,12-dihydroquino[2,3-b]acridine-7,14-dione (i.e. quinacridone), dimethylquinacridone and dimethoxyquinacridone, (v) quinacridonequinone type compounds, e.g. quino[2,3-b]acridine-6,7,13,14(5H,12H)-tetrone (i.e. quinacridonequinone), and (vi) dimethoxyquinacridonequinone and dihydroquinacridone type compounds, e.g. 5,6,12,13-tetrahydroquino[2,3-b]acridine-7,14-dione (i.e. a dihydroquinacridone), dimethoxydihydroquinacridone and dibenzodihydroquinacridone.

Still further suitable beta-nucleating agents are dicarboxylic acid salts of metals from group IIa of periodic table, e.g.

pimelic acid calcium salt and suberic acid calcium salt; and mixtures of dicarboxylic acids and salts of metals from group IIa of the periodic table.

Still further suitable beta-nucleating agents are salts of metals from group IIa of periodic system and imido acids of the formula

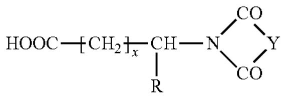

wherein x=0 to 4; R=H, —COOH, C1-C12-alkyl, C5-C8-cycloalkyl or C6-C12-aryl, and Y=C1-C12-alkyl, C5-C8-cycloalkyl or C6-C12-aryl-substituted bivalent C6-C12-aromatic residues, e.g.

calcium salts of phthaloylglycine, hexahydrophthaloylglycine, N-phthaloylalanine, phthalimidoacetate and/or N-4-methylphthaloylglycine.

Preferred beta-nucleating agents are any one or mixtures of N,N'-dicyclohexyl-2,6-naphtalene dicarboxamide, the beta-nucleating agents of EP 177961 and those of EP 682066.

Particularly preferred beta-nucleating agents are any one or mixtures of 5,12-dihydro-quino[2,3-b]acridine-7,14-dione (CAS 1047-16-1) (i.e. quinacridone), quino[2,3-b]acridine-6,7,13,14(5H,12H)-tetrone (CAS 1503-48-6) (i.e. quinacridonequinone), 5,6,12,13-tetrahydroquino[2,3-b]acridine-7,14-dione (CAS 5862-38-4) (i.e. a dihydroquinacridone), N,N'-dicyclohexyl-2,6-naphtalene dicarboxamide (CAS 153250-52-3) and salts of dicarboxylic acids with at least 7 carbon atoms with metals of group IIa of the periodic table, preferably calcium pimelate (CAS 19455-79-9).

Especially preferred is quino[2,3-b]acridine-6,7,13,14(5H,12H)-tetrone (CAS 1503-48-6) (i.e. quinacridonequinone) which is commercially available as Cinquasia CGNA-7588 from BASF.

Typically the amount of beta-nucleating agent in the polypropylene composition is the range of from 1 ppm to 2500 ppm, preferably 10 ppm to 1000 ppm, most preferably 25 ppm to 500 ppm.

When the beta-nucleating agent is selected from any one or mixtures of quinacridone type compounds and quinacridonequinone type compounds and dihydroquinacridone type compounds in said embodiment, the beta nucleating agent is preferably present in the polypropylene composition in an amount of from 1 ppm to 500 ppm, more preferably from 10 ppm to 250 ppm and most preferably from 25 ppm to 150 ppm.

Acid scavengers can be e.g. calcium stearate or magnesium oxide. The acid scavenger is preferably present in the polypropylene composition in an amount of from 10 to 50000 ppm, preferably from 50 to 35000 ppm, most preferably from 100 to 20000 ppm, based on the total weight amount of the polypropylene composition.

Antioxidants can be selected from any suitable antioxidant known in the art for polypropylene compositions suitable for cable insulations.

It is especially preferred that the polypropylene composition does not comprise, i.e. is free of a dielectric fluid as described e.g. in EP 2 739 679.

The polypropylene composition has a high flexibility which can be seen in a flexural modulus of not more than 470 MPa, such as from 200 to 470 MPa, preferably from 250 to 450 MPa and most preferably from 300 to 430 MPa.

Further, the polypropylene composition preferably has good impact properties, which can be seen in a Charpy notched impact strength at 23° C. and −20° C.

Preferably, the polypropylene composition has a Charpy notched impact strength at 23° C. of at least 70.0 kJ/$m^2$, such as from 70.0 to 100.0 KJ/$m^2$, more preferably from 72.5 to 95.0 kJ/$m^2$ and most preferably from 75.0 to 90.0 KJ/$m^2$.

Further, the polypropylene composition preferably has a Charpy notched impact strength at −20° C. of at least 3.5 kJ/$m^2$, such as from 3.5 to 10.0 KJ/$m^2$, more preferably from 3.7 to 9.0 KJ/$m^2$ and most preferably from 4.0 to 8.0 KJ/$m^2$.

The polypropylene composition has a melt flow rate $MFR_2$ of from 0.5 to 5.0 g/10 min, preferably from 0.8 to 4.5 g/10 min, still more preferably from 1.0 to 4.3 g/10 min and most preferably from 1.2 to 4.0 g/10 min.

Further, the polypropylene composition has a melting temperature Tm of from 140 to 159° C., preferably from 143 to 157° C. and most preferably from 145 to 153° C.

Additionally, the polypropylene composition has a crystallization temperature Tc of from 105 to 130° C., preferably from 107 to 128° C. and most preferably from 110 to 125° C.

The difference of the melting temperature to the crystallization temperature Tm-Tc is preferably in the range of from 20 to 45° C., preferably 25 to 40° C. and most preferably from 27 to 37° C.

The polypropylene composition has a total amount of comonomer units of from 10.0 to 16.0 wt %, preferably from 10.5 to 15.0 wt %, most preferably from 11.0 to 14.0 wt %, based on the total amount of monomer units in the polypropylene composition. The comonomer units are selected from ethylene and alpha-olefins having from 4 to 12 carbon atoms, such as ethylene, 1-butene, 1-hexene or 1-octene. The polypropylene composition can comprise one type of comonomer units or two or more types such as two types of comonomer units. It is preferred that the polypropylene composition comprises one type of comonomer units. Especially preferred is ethylene.

It is preferred that the polypropylene composition has an intrinsic viscosity of from 185 to 350 $cm^3$/g, preferably from 200 to 325 $cm^3$/g and most preferably from 210 to 300 $cm^3$/g, measured in decalin.

The polypropylene composition has a xylene cold soluble (XCS) fraction in a total amount of from 25.0 to 50.0 wt %, preferably from 27.5 to 45.0 wt %, more preferably from 30.0 to 42.5 wt % and most preferably from 32.5 to 41.0 wt %, based on the total weight amount of the polypropylene composition.

The xylene cold soluble (XCS) fraction has an amount of comonomer units, preferably of ethylene, of at least 23.0 wt %, such as 23.0 to 35.0 wt %, preferably from 23.5 to 32.5 wt % and most preferably from 24.0 wt % to 30.0 wt %, based on the total amount of monomer units in the xylene cold soluble (XCS) fraction.

Further, the xylene cold soluble (XCS) fraction preferably has an intrinsic viscosity of from 150 to 350 $cm^3$/g, preferably from 165 to 325 $cm^3$/g and most preferably from 175 to 300 $cm^3$/g, measured in decalin.

Additionally, the xylene cold soluble (XCS) fraction preferably has a weight average molecular weight Mw of from 185000 to 350000 g/mol, more preferably from 200000 to 325000 g/mol and most preferably from 210000 to 315000 g/mol.

Furthermore, the xylene cold soluble (XCS) fraction preferably has a polydispersity index, being the ratio of the weight average molecular weight and the number average molecular weight Mw/Mn, of from 3.5 to 8.5, preferably from 3.7 to 8.0 and most preferably from 4.0 to 7.5.

Further, the polypropylene composition has a fraction insoluble in cold xylene (XCI) preferably in a total amount of from 50.0 to 75.0 wt %, preferably from 55.0 to 72.5 wt %, more preferably from 57.5 to 70.0 wt % and most preferably from 59.0 to 67.5 wt %, based on the total weight amount of the polypropylene composition.

The fraction insoluble in cold xylene (XCI) preferably has an amount of comonomer units, preferably of ethylene, of from 3.0 to 9.0 wt %, more preferably from 4.0 to 8.5 wt % and most preferably from 4.5 to 7.5 wt %, based on the total amount of monomer units in the fraction insoluble in cold xylene (XCI).

Further, the fraction insoluble in cold xylene (XCI) preferably has an intrinsic viscosity of from 185 to 350 $cm^3/g$, preferably from 220 to 325 $cm^3/g$ and most preferably from 210 to 300 $cm^3/g$, measured in decalin.

Additionally, the fraction insoluble in cold xylene (XCI) preferably has a weight average molecular weight Mw of from 225000 to 450000 g/mol, more preferably from 240000 to 425000 g/mol and most preferably from 260000 to 400000 g/mol.

Furthermore, the fraction insoluble in cold xylene (XCI) preferably has a polydispersity index, being the ratio of the weight average molecular weight and the number average molecular weight Mw/Mn, of from 3.5 to 7.5, preferably from 3.7 to 7.0 and most preferably from 4.0 to 6.5.

The ratio of the intrinsic viscosities of the XCI fraction to the XCS fraction is preferably in the range of from 0.9 to 1.5, more preferably from 1.0 to 1.4 and most preferably from 1.0 to 1.3.

The ratio of the weight average molecular weights of the XCI fraction to the XCS fraction is preferably in the range of from 1.05 to 1.50, more preferably from 1.10 to 1.40 and most preferably from 1.20 to 1.35.

Preferably, the polypropylene composition is prepared by melt blending the copolymer of propylene and comonomer units selected from ethylene and alpha-olefins having from 4 to 12 carbon atoms (A), the alpha-nucleating agent (B), the optional additional polymeric components such as the propylene polymer grafted with an acid grafting agent and the optional further additives such as the antioxidants, the beta-nucleating agent and/or the acid scavenger, all as described above or below.

In the following, the copolymer of propylene and comonomer units selected from ethylene and alpha-olefins having from 4 to 12 carbon atoms (A) (abbreviated "copolymer of propylene") is described in more detail.

Copolymer of Propylene (A)

The polypropylene composition according to the invention comprises a copolymer of propylene and comonomer units selected from ethylene and alpha-olefins having from 4 to 12 carbon atoms (A) (in the following "copolymer of propylene").

The comonomer units are selected from ethylene and alpha-olefins having from 4 to 12 carbon atoms, such as ethylene, 1-butene, 1-hexene or 1-octene. The copolymer of propylene can comprise one type of comonomer units or two or more types such as two types of comonomer units. It is preferred that the copolymer of propylene comprises one type of comonomer units. Especially preferred is ethylene.

The copolymer of propylene preferably has a total amount of comonomer units, preferably of ethylene, of from 10.0 to 16.0 wt %, preferably from 10.5 to 15.0 wt %, most preferably from 11.0 to 14.0 wt %, based on the total amount of monomer units in the copolymer of propylene.

It is preferred that the copolymer of propylene is a heterophasic copolymer of propylene.

The heterophasic propylene copolymer has a matrix phase and an elastomeric phase dispersed in said matrix phase.

The matrix phase is preferably a propylene random copolymer.

The comonomer units of said propylene random copolymer of the matrix phase usually are the same as for the copolymer of propylene as described above. Said comonomer units preferably are selected from ethylene and alpha-olefins having from 4 to 12 carbon atoms, such as ethylene, 1-butene, 1-hexene or 1-octene. The propylene random copolymer of the matrix phase can comprise one type of comonomer units or two or more types such as two types of comonomer units. It is preferred that the propylene random copolymer of the matrix phase comprises one type of comonomer units. Especially preferred is ethylene.

Heterophasic propylene copolymers are typically characterized by comprising at least two glass transition temperatures. Said two glass transition temperatures can be attributed to the matrix phase (Tg (matrix)) and the elastomeric phase (Tg (EPR)). The heterophasic propylene copolymer preferably has a glass transition temperature attributed to the matrix phase Tg (matrix) in the range of from −1.0 to −15.0° C., preferably from −2.5 to −12.5° C. and most preferably from −5.0 to −10.0° C. Further, the heterophasic propylene copolymer preferably has a glass transition temperature attributed to the elastomeric phase Tg (EPR) is in the range of from −40.0 to −55.0° C., preferably from −42.5 to −52.5° C. and most preferably from −45.0 to −50.0° C.

In a copolymer of propylene, such as a heterophasic propylene copolymer, the matrix phase and the elastomeric phase usually cannot exactly be divided from each other. In order to characterize the matrix phase and the elastomeric phase of a heterophasic polypropylene copolymer several methods are known. One method is the extraction of a fraction, which contains to the most part the elastomeric phase with xylene, thus separating a xylene cold solubles (XCS) fraction from a xylene cold insoluble (XCI) fraction. The XCS fraction contains for the most part the elastomeric phase and only a small part of the matrix phase whereas the XCI fraction contains for the most part the matrix phase and only a small part of the elastomeric phase.

The copolymer of propylene preferably has a xylene cold soluble (XCS) fraction in a total amount of from 25.0 to 50.0 wt %, more preferably from 27.5 to 45.0 wt %, still more preferably from 30.0 to 42.5 wt % and most preferably from 32.5 to 41.0 wt %, based on the total weight amount of the copolymer of propylene.

The xylene cold soluble (XCS) fraction preferably has an amount of comonomer units, preferably of ethylene, of from 23.0 to 35.0 wt %, more preferably from 23.5 to 32.5 wt % and most preferably from 24.0 wt % to 30.0 wt %, based on the total amount of monomer units in the xylene cold soluble (XCS) fraction.

Further, the xylene cold soluble (XCS) fraction preferably has an intrinsic viscosity of from 150 to 350 $cm^3/g$, preferably from 165 to 325 $cm^3/g$ and most preferably from 175 to 300 $cm^3/g$, measured in decalin.

Further, the copolymer of propylene has a fraction insoluble in cold xylene (XCI) preferably in a total amount of from 50.0 to 75.0 wt %, more preferably from 55.0 to 72.5 wt %, still more preferably from 57.5 to 70.0 wt % and most preferably from 59.0 to 67.5 wt %, based on the total weight amount of the copolymer of propylene.

The fraction insoluble in cold xylene (XCI) preferably has an amount of comonomer units, preferably of ethylene, of from 3.0 to 9.0 wt %, preferably from 4.0 to 8.5 wt % and most preferably from 4.5 to 7.5 wt %, based on the total amount of monomer units in the fraction insoluble in cold xylene (XCI).

Further, the fraction insoluble in cold xylene (XCI) preferably has an intrinsic viscosity of from 185 to 350 $cm^3/g$, preferably from 220 to 325 $cm^3/g$ and most preferably from 210 to 300 $cm^3/g$, measured in decalin.

The ratio of the intrinsic viscosities of the XCI fraction to the XCS fraction of the copolymer of propylene is preferably in the range of from 0.9 to 1.5, more preferably from 1.0 to 1.4 and most preferably from 1.0 to 1.3.

The copolymer of propylene before compounding preferably has a melt flow rate $MFR_2$ of 0.5 to 2.5 g/10 min, preferably from 0.8 to 2.2 g/10 min, still more preferably from 1.0 to 2.0 g/10 min and most preferably from 1.2 to 1.9 g/10 min.

The copolymer of propylene preferably has a flexural modulus of from 130 MPa to 380 MPa, more preferably of from 150 MPa to 365 MPa and most preferably of from 175 MPa to 350 MPa.

Preferably, the copolymer of propylene has a Charpy notched impact strength at 23° C. of from 40 to 110 $kJ/m^2$, more preferably from 50 to 100 $kJ/m^2$ and most preferably from 55 to 95 $KJ/m^2$.

The copolymer of propylene can be polymerized in a sequential multistage polymerization process, i.e. in a polymerization process in which two or more polymerization reactors are connected in series. Preferably, in the sequential multistage polymerization process, two or more, more preferably three or more, such as three or four, polymerization reactors are connected in series. The term “polymerization reactor” shall indicate that the main polymerization takes place. Thus in case the process consists of four polymerization reactors, this definition does not exclude the option that the overall process comprises for instance a pre-polymerization step in a pre-polymerization reactor.

When the copolymer of propylene is a heterophasic propylene copolymer, the matrix phase of the heterophasic propylene copolymer is polymerized in first polymerization reactor for producing a unimodal matrix phase or in the first and second polymerization reactor for producing a multimodal matrix phase. The elastomeric phase of the heterophasic propylene copolymer is preferably polymerized in the subsequent one or two polymerization reactor(s) in the presence of the matrix phase for producing a unimodal elastomeric phase or a multimodal elastomeric phase.

Preferably, the polymerization reactors are selected from slurry phase reactors, such as loop reactors and/or gas phase reactors such as fluidized bed reactors, more preferably from loop reactors and fluidized bed reactors.

A preferred sequential multistage polymerization process is a “loop-gas phase”-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of LyondellBasell.

Suitable sequential polymerization processes for polymerizing the copolymer of propylene, preferably the heterophasic propylene copolymer, are e.g. disclosed in EP 1 681 315 A1 or WO 2013/092620 A1.

The copolymer of propylene, preferably the heterophasic propylene copolymer can be polymerized in the presence of a Ziegler-Natta catalyst or a single site catalyst. Suitable Ziegler-Natta catalysts are e.g. disclosed in U.S. Pat. No. 5,234,879, WO 92/19653, WO 92/19658, WO 99/33843, WO 03/000754, WO 03/000757, WO 2013/092620 A1 or WO 2015/091839.

Suitable single site catalysts are e.g. disclosed in WO 2006/097497, WO 2011/076780 or WO 2013/007650.

The copolymer of propylene is preferably not subjected to a visbreaking step as e.g. described in WO 2013/092620 A1. In said embodiment the resulting polypropylene composition preferably has a melt flow rate of from 0.5 to 2.5 g/10 min, preferably from 0.8 to 2.3 g/10 min, still more preferably from 1.0 to 2.0 g/10 min and most preferably from 1.2 to 1.9 g/10 min.

In another embodiment the copolymer of propylene is preferably subjected to a visbreaking step as e.g. described in WO 2013/092620 A1. In said embodiment the resulting polypropylene composition preferably has a melt flow rate of from more than 2.5 to 5.0 g/10 min, preferably from 3.0 to 4.5 g/10 min, still more preferably from 3.2 to 4.3 g/10 min and most preferably from 3.5 to 4.0 g/10 min.

Heterophasic propylene copolymer resins suitable as copolymer of propylene are also commercially available. These resins are usually already additivated with stabilizer packages. Thus, when using commercially available resins as copolymer of propylene the addition of additives as described above might have to be adjusted to the already present additives.

Embodiments of the Polypropylene Composition

The polypropylene composition according to the present invention includes different embodiments.

In one embodiment the polypropylene composition has a melt flow rate of from 0.5 to 2.5 g/10 min, preferably from 0.8 to 2.3 g/10 min, still more preferably from 1.0 to 2.0 g/10 min and most preferably from 1.2 to 1.9 g/10 min. In said embodiment, the polypropylene composition is preferably not subjected to a vis-breaking step.

The xylene cold soluble (XCS) fraction of the polypropylene composition of said embodiment preferably has a weight average molecular weight Mw of from 250000 to 350000 g/mol, more preferably from 260000 to 325000 g/mol and most preferably from 270000 to 315000 g/mol.

Furthermore, the xylene cold soluble (XCS) fraction preferably has a polydispersity index, being the ratio of the weight average molecular weight and the number average molecular weight Mw/Mn, of from 5.0 to 8.5, preferably from 5.5 to 8.0 and most preferably from 6.0 to 7.5.

Additionally, the fraction insoluble in cold xylene (XCI) of the polypropylene composition of said embodiment preferably has a weight average molecular weight Mw of from 325000 to 450000 g/mol, more preferably from 340000 to 425000 g/mol and most preferably from 360000 to 400000 g/mol.

Furthermore, the fraction insoluble in cold xylene (XCI) preferably has a polydispersity index, being the ratio of the weight average molecular weight and the number average molecular weight Mw/Mn, of from 4.0 to 7.5, preferably from 4.5 to 7.0 and most preferably from 5.0 to 6.5.

The ratio of the weight average molecular weights of the XCI fraction to the XCS fraction is preferably in the range of from 1.05 to 1.50, more preferably from 1.10 to 1.40 and most preferably from 1.20 to 1.35.

In said embodiment, the polypropylene composition can comprise additional components selected from a beta-nucleating agent or a polyolefin functionalized with a mono- or polycarboxylic acid compound or a derivative of a mono- or polycarboxylic acid compound.

It is, however, preferred that the polypropylene composition of said embodiment consists of the copolymer of propylene having a melt flow rate of from 0.5 to 2.5 g/10 min, preferably from 0.8 to 2.3 g/10 min, still more preferably from 1.0 to 2.0 g/10 min and most preferably from 1.2 to 1.9 g/10 min as described above, the alpha-nucleating agent and optionally antioxidants and/or acid scavengers as additives.

The polypropylene composition having a low melt flow rate preferably meets all properties as described above.

In a further embodiment the polypropylene composition has a melt flow rate $MFR_2$ of from more than 2.5 to 5.0 g/10 min, preferably from 3.0 to 4.5 g/10 min, still more preferably from 3.2 to 4.3 g/10 min and most preferably from 3.5 to 4.0 g/10 min. The higher melt flow rate can be obtained by vis-breaking of a polypropylene composition of the first embodiment. Said vis-breaking step usually not only influences the melt flow rate but also the weight average molecular weight and polydispersity index.

The xylene cold soluble (XCS) fraction of the polypropylene composition of the further embodiment preferably has a weight average molecular weight Mw of from 250000 to 350000 g/mol, more preferably from 185000 to 300000 g/mol, more preferably from 200000 to 275000 g/mol and most preferably from 210000 to 250000 g/mol.

Furthermore, the xylene cold soluble (XCS) fraction preferably has a polydispersity index, being the ratio of the weight average molecular weight and the number average molecular weight Mw/Mn, of from 3.5 to 6.0, preferably from 3.7 to 5.5 and most preferably from 4.0 to 5.0.

Additionally, the fraction insoluble in cold xylene (XCI) of the polypropylene composition of the further embodiment preferably has a weight average molecular weight Mw of from 225000 to 350000 g/mol, more preferably from 240000 to 325000 g/mol and most preferably from 260000 to 300000 g/mol.

Furthermore, the fraction insoluble in cold xylene (XCI) preferably has a polydispersity index, being the ratio of the weight average molecular weight and the number average molecular weight Mw/Mn, of from 3.5 to 6.0, preferably from 3.7 to 5.5 and most preferably from 4.0 to 5.0.

The ratio of the weight average molecular weights of the XCI fraction to the XCS fraction is preferably in the range of from 1.05 to 1.50, more preferably from 1.10 to 1.40 and most preferably from 1.20 to 1.35.

In said further embodiment the polypropylene composition preferably has a flexural modulus of from 200 MPa to less than 400 MPa, preferably from 250 to 390 MPa and most preferably from 300 to 380 MPa.

In said embodiment, the polypropylene composition can comprise additional components selected from a beta-nucleating agent or a polyolefin functionalized with a mono- or polycarboxylic acid compound or a derivative of a mono- or polycarboxylic acid compound.

It is, however, preferred that the polypropylene composition of said embodiment consists of the copolymer of propylene having a melt flow rate of from more than 2.5 to 5.0 g/10 min, preferably from 3.0 to 4.5 g/10 min, still more preferably from 3.2 to 4.3 g/10 min and most preferably from 3.5 to 4.0 g/10 min as described above, the alpha-nucleating agent and optionally antioxidants and/or acid scavengers as additives.

The polypropylene composition having a high melt flow rate preferably meets all properties as described above.

Article

In a further aspect the present invention further relates to an article comprising the polypropylene composition as defined above or below.

The article is preferably a cable comprising an insulation layer comprising the polypropylene composition as described above or below.

The cable usually comprises of at least one conductor and at least one insulation layer comprising the polypropylene composition as described above or below.

The term "conductor" means herein above and below that the conductor comprises one or more wires. The wire can be for any use and be e.g. optical, telecommunication or electrical wire. Moreover, the cable may comprise one or more such conductors. Preferably the conductor is an electrical conductor and comprises one or more metal wires. The cable is preferably a power cable. A power cable is defined to be a cable transferring energy operating at any voltage, typically operating at voltages higher than 1 kV. The voltage applied to the power cable can be alternating (AC), direct (DC), or transient (impulse). The polypropylene composition of the invention is very suitable for power cables, especially for power cables operating at voltages 6 kV to 36 kV (medium voltage (MV) cables) and at voltages higher than 36 kV, known as high voltage (HV) cables and extra high voltage (EHV) cables, which EHV cables operate, as well known, at very high voltages. The terms have well known meanings and indicate the operating level of such cables.

For low voltage applications the cable system typically either consists of one conductor and one insulation layer comprising the polypropylene composition as described above or below, or of one conductor, one insulation layer comprising the polypropylene composition as described above or below and an additional jacketing layer, or of one conductor, one semiconductive layer and one insulation layer comprising the polypropylene composition as described above or below. For medium and high voltage applications the cable system typically consists of one conductor, one inner semiconductive layer, one insulation layer comprising the polypropylene composition as described above or below and one outer semiconductive layer, optionally covered by an additionally jacketing layer.

The semiconductive layers mentioned preferably comprise, more preferably consist of a thermoplastic polyolefin composition, preferably a polyethylene composition or a polypropylene composition, containing a sufficient amount of electrically conducting solid fillers preferably carbon black. It is preferred that the thermoplastic polyolefin composition of the semiconductive layer(s) is a polypropylene composition, more preferably a polypropylene composition comprising a heterophasic propylene copolymer as polymeric component. It is especially preferred that the thermoplastic polyolefin composition of the at least one semiconductive layer, preferably both semiconductive layers of the cable, comprise the same copolymer of propylene as the insulation layer, i.e. the copolymer of propylene (A) as described above or below.

The cable comprising an insulation layer comprising the polypropylene composition according to the invention as described above shows good electrical properties in form of Weibull alpha-value and Weibull beta-value.

The cable preferably has a Weibull alpha-value of at least 35 kV/mm, such as from 35.0 to 65.0 kV/mm, more preferably from 40.0 to 65.0 kV/mm and most preferably from 43.0 to 65.0 kV/mm, when measured on a 10 kV cable.

Still further, the cable preferably has a Weibull beta-value of at least 7.5, such as from 7.5 to 250.0, more preferably from 8.0 to 250.0, most preferably from 8.5 to 250.0, when measured on a 10 kV cable.

Thus, the insulation layer comprising the polypropylene composition according to the invention can be used for medium and high voltage cables.

In yet another aspect the present invention relates to the use of the polypropylene composition as described above or below as cable insulation for medium and high voltage cables.

Said medium and high voltage cables preferably meet all properties requirements as described for the cables above and below.

Benefits of the Invention:

The inventive polypropylene composition shows a good balance of properties regarding high flexibility, a good mechanical strength, good impact properties and high crystallization and melting temperature which allows the use as cable insulation e.g. for medium and high voltage cables at high operation temperatures.

Cables comprising an insulation layer comprising the inventive polypropylene composition surprisingly show good electric breakdown strength in form of Weibull alpha-value and Weibull beta-value.

The presence of the alpha-nucleating agent in the inventive polypropylene composition thereby further improves the electrical properties, especially shown in a more narrow distribution of the electric breakdown strength values and consequently a higher Weibull beta value.

It has been found that even with melt flow rates as low as 0.5 to 2.5 g/10 min the inventive polypropylene can be easily compounded to prepare the insulation layer without need of increasing the melt flow rate via visbreaking.

The good electric breakdown strength in form of Weibull alpha-value and Weibull beta-value can be obtained without addition of a dielectric fluid such as e.g. described in EP 2 739 679.

When adapting the semiconductive composition of the semiconductive layers to a propylene based composition instead of an ethylene based composition the electrical properties can further be improved. It is believed that this behavior results from an increased adhesion between the semiconductive and insulation layer due to the similar polymeric compositions.

The polypropylene composition as described above or below thus shows a superior balance of properties as regards high flexibility, a good mechanical strength, good impact properties and high crystallization and melting temperature which allows the use as cable insulation e.g. for medium and high voltage cables at high operation temperatures with good electric breakdown strength.

EXAMPLES

The following definitions of terms and determination methods apply for the above general description of the invention as well as to the below examples unless otherwise defined.

1. Measurement Methods a) Melt Flow Rate ($MFR_2$)

The melt flow rate is the quantity of polymer in grams which the test apparatus standardized to ISO 1133 or ASTM D1238 extrudes within 10 minutes at a certain temperature under a certain load.

The melt flow rate $MFR_2$ of propylene based polymers and the polypropylene composition is measured at 230° C. with a load of 2.16 kg according to ISO 1133. The melt flow rate $MFR_2$ of the ethylene based polymers and polyethylene compositions is measured at 190° C. with a load of 2.16 kg according to ISO 1133.

b) Comonomer Content Quantitative nuclear-magnetic resonance (NMR) spectroscopy was used to quantify the comonomer content of the polymers.

Comonomer Content Quantification of Poly(Propylene-Co-Ethylene) Copolymers

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probe head at 125° C. using nitrogen gas for all pneumatics.

Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent {8}. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {3, 4}. A total of 6144 (6 k) transients were acquired per spectra.

Quantitative $^{13}C\{1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}C\{^1H\}$ spectra. This method was chosen for its robust nature and ability to account for the presence of regiodefects when needed. Integral regions were slightly adjusted to increase applicability across the whole range of encountered comonomer contents. For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E\,[\text{mol }\%]=100*fE$$

The weight percent comonomer incorporation was calculated from the mole fraction:

$$E[\text{wt}\ \%]=100*(fE*28.06)/((fE*28.06)+((1-fE)*42.08))$$

BIBLIOGRAPHIC REFERENCES

1) Busico, V., Cipullo, R., Prog. Polym. Sci. 26 (2001) 443.
2) Busico, V., Cipullo, R., Monaco, G., Vacatello, M., Segre, A. L., Macromolecules 30 (1997) 6251.
3) Zhou, Z., Kuemmerle, R., Qiu, X., Redwine, D., Cong, R., Taha, A., Baugh, D. Winniford, B., J. Mag. Reson. 187 (2007) 225.
4) Busico, V., Carbonniere, P., Cipullo, R., Pellecchia, R., Severn, J., Talarico, G., Macromol. Rapid Commun. 2007, 28, 1128.
5) Resconi, L., Cavallo, L., Fait, A., Piemontesi, F., Chem. Rev. 2000, 100, 1253.
6) Wang, W-J., Zhu, S., Macromolecules 33 (2000), 1157.
7) Cheng, H. N., Macromolecules 17 (1984), 1950.
8) Singh, G., Kothari, A., Gupta, V., Polymer Testing 28 5 (2009), 475.
9) Kakugo, M., Naito, Y., Mizunuma, K., Miyatake, T. Macromolecules 15 (1982) 1150.
10) Randall, J. Macromol. Sci., Rev. Macromol. Chem. Phys. 1989, C29, 201.
11) Resconi, L., Cavallo, L., Fait, A., Piemontesi, F., Chem. Rev. 2000, 100, 1253.

c) Differential Scanning Calorimetry (DSC) Analysis, Melting Temperature (Tm) and Crystallization Temperature (Tc):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C.

Crystallization temperature and heat of crystallization (Hc) are determined from the cooling step, while melting temperature and heat of fusion (Hf) are determined from the second heating step.

When a sample shows two or more melting temperatures and/or crystallization temperatures only the main melting temperature (at the highest Hc) and main crystallization temperature (at the highest Hf) are displayed in the accordant table. The difference of melting temperature and crystallization temperature (Tm-Tc) is given for the maim melting temperature and the main crystallization temperature.

d) Xylene Cold Solubles (XCS) Content

The quantity of xylene soluble matter in polypropylene is detemined according to the ISO16152 (first edition; 2005-07-01).

A weighed amount of a sample is dissolved in hot xylene under reflux conditions at 135° C. The solution is then cooled down under controlled conditions and maintained at 25° C. for 30 minutes to ensure controlled crystallization of the insoluble fraction. This insoluble fraction is then separated by filtration. Xylene is evaporated from the filtrate leaving the soluble fraction as a residue. The percentage of this fraction is determined gravimetrically.

$$\%\ XS=\frac{m_1\times v_0}{m_0\times v_1}\times 100$$

where $m_0$ is the mass of the sample test portion weighed, in grams $m_1$ is the mass of residue, in grams $v_0$ is the original volume of solvent taken $v_1$ is the volume of the aliquot taken for determination.

e) Intrinsic Viscosity ($IV_{int}$)

The reduced viscosity (also known as viscosity number), $\eta_{red}$, and intrinsic viscosity, [η], are determined according to ISO 1628-3: "Determination of the viscosity of polymers in dilute solution using capillary viscometers".

Relative viscosities of a diluted polymer solution with concentration of 1 mg/ml and of the pure solvent (decahydronaphthalene stabilized with 200 ppm 2,6-bis(1,1-dimethylethyl)-4-methylphenol) are determined in an automated capillary viscometer (Lauda PVS1) equipped with 4 Ubbelohde capillaries placed in a thermostatic bath filled with silicone oil. The bath temperature is maintained at 135° C. The sample is dissolved with constant stirring until complete dissolution is achieved (typically within 90 min).

The efflux time of the polymer solution as well as of the pure solvent are measured several times until three consecutive readings do not differ for more than 0.2 s (standard deviation).

The relative viscosity of the polymer solution is determined as the ratio of averaged efflux times in seconds obtained for both, polymer solution and solvent:

$$\eta_{rel}=\frac{t_{solution}-t_{solvent}}{t_{solvent}}\ [\text{dimensionless}]$$

Reduced viscosity ($\eta_{red}$) is calculated using the equation:

$$\eta_{red}=\frac{t_{solution}-t_{solvent}}{t_{solvent}*C}\ [dl/g]$$

where C is the polymer solution concentration at 135° C.:

$$C=\frac{m}{V\gamma},$$

and m is the polymer mass, V is the solvent volume, and γ is the ratio of solvent densities at 20° C. and 135° C. ($\gamma=\rho_{20}/\rho_{135}=1.107$).

The calculation of intrinsic viscosity [η] is performed by using the Schulz-Blaschke equation from the single concentration measurement:

$$[\eta]=\frac{\eta_{red}}{1+K+C+\eta_{red}}$$

where K is a coefficient depending on the polymer structure and concentration. For calculation of the approximate value for [η], K=0.27.

f) Molecular Weight Averages, Polydispersity (Mn, Mw, Mz, MWD) by GPC-Analysis (GPC)

For the GPC analysis the column set was calibrated using universal calibration (according to ISO 16014-2:2003) with 19 narrow MWD polystyrene (PS) standards in the range of 0.5 kg/mol to 11 500 kg/mol. The PS standards were dissolved at 160° C. for 15 min or alternatively at room temperatures at a concentration of 0.2 mg/ml for molecular weight higher and equal 899 kg/mol and at a concentration of 1 mg/ml for molecular weight below 899 kg/mol. The conversion of the polystyrene peak molecular weight to polyethylene molecular weights is accomplished by using the Mark Houwink equation and the following Mark Houwink constants:

$$K_{PS}=19\times10^{-3}\ \text{ml/g},\ \alpha_{PS}=0.655$$

$$K_{PE}=39\times10^{-3}\ \text{ml/g},\ \alpha_{PE}=0.725$$

A third order polynomial fit was used to fit the calibration data.

Molecular weight averages (Mz, Mw and Mn), Molecular weight distribution (MWD) and its broadness, described by polydispersity index, PD=Mw/Mn (wherein Mn is the number average molecular weight and Mw is the weight average molecular weight) were determined using the following formulas:

$$M_n = \frac{\sum_{i=1}^{N} A_i}{\Sigma(A_i/M_i)} \quad (1)$$

$$M_w = \frac{\sum_{i=1}^{N} (A_i \times M_i)}{\Sigma A_i} \quad (2)$$

$$M_z = \frac{\sum_{i=1}^{N} (A_i \times M_i^2)}{\Sigma(A_i/M_i)} \quad (3)$$

g) Flexural Modulus

The flexural modulus was determined acc. to ISO 178 method A (3-point bending test) on 80 mm×10 mm×4 mm specimens. Following the standard, a test speed of 2 mm/min and a span length of 16 times the thickness was used. The testing temperature was 23±2° C. Injection moulding was carried out according to ISO 19069-2 using a melt temperature of 230° C. for all materials irrespective of material melt flow rate.

h) Charpy Notched Impact Strength

The Charpy notched impact strength was determined acc. to ISO 179-1/1eA on notched 80 mm×10 mm×4 mm specimens (specimens were prepared according to ISO 179-1/1eA). Testing temperatures were 23±2° C. or −20±2° C. Injection moulding was carried out acc. to ISO 19069-2 using a melt temperature of 230° C. for all materials irrespective of material melt flow rate.

i) AC electric Breakdown Strength (ACBD)

The AC breakdown tests were performed in agreement with CENELEC HD 605 5.4.15.3.4 for 6/10 kV cables. The cable was thus cut into six test samples of 10 meter active length (terminations in addition). The samples were tested to breakdown with a 50 Hz AC step test at ambient temperature, according to the following procedure:

Start at 18 kV for 5 minutes

Voltage increasing in step of 6 kV every 5 minutes until breakdown occurs

The calculation of the Weibull parameters of the data set of six breakdown values (conductor stress, i.e. the electric field at the inner semiconductive layer) follows the least squares regression procedure as described in IEC 62539 (2007). The Weibull alpha parameter in this document refers to the scale parameter of the Weibull distribution, i.e. the voltage for which the failure probability is 0.632. The Weibull beta value refers to the shape parameter.

2. Propylene Copolymer Composition

The following resins were used for the preparation of the propylene copolymer compositions of the examples:

a) Polymerization of the Heterophasic Propylene Copolymer Powders A1 and A2

Catalyst

The catalyst used in the polymerization process for the heterophasic propylene copolymer powders, A1 and A2, was a Ziegler-Natta catalyst, which is described in patent publications EP491566, EP591224 and EP586390. As co-catalyst triethyl-aluminium (TEAL) and as donor dicyclo pentyl dimethoxy silane (D-donor) was used.

Polymerization of the Heterophasic Propylene Copolymer Powders

Heterophasic propylene copolymer powders, A1 and A2, were produced in a Borstar™ plant in the presence of the above described polymerization catalyst using one liquid-phase loop reactor and two gas phase reactors connected in series under conditions as shown in Table 1. The first reaction zone was a loop reactor and the second and third reaction zones were gas phase reactors. The matrix phase was polymerized in the loop and first gas phase reactor and the elastomeric phase was polymerized in the second gas phase reactor. The catalyst as described above was fed into a prepolymerization reactor which precedes the first reaction zone.

TABLE 1

Polymerization conditions of heterophasic propylene copolymer powders A1 and A2:

| | | A1-powder | A2-powder |
|---|---|---|---|
| Prepolymerization | | | |
| TEAL/Ti ratio | [mol/mol] | 342 | 404 |
| Donor/Ti ratio | [mol/mol] | 26.9 | 27.1 |
| Temperature | [° C.] | 19.9 | 20.0 |
| Residence time | [h] | 0.16 | 0.15 |
| Loop | | | |
| Temperature | [° C.] | 70.0 | 70.0 |
| Pressure | [barg] | 55 | 55 |
| Split (Loop + Prepol) | [%] | 33.7 | 32.6 |
| H2/C3 ratio | [mol/kmol] | 5.5 | 5.0 |
| C2/C3 ratio | [mol/kmol] | 16.7 | 17.2 |
| MFR (230° C./2.16 kg) | [g/10 min] | 6.5 | 5.4 |
| C2 content (calc.) | [wt %] | 2.0 | 2.0 |
| GPR 1 | | | |
| Temperature | [° C.] | 74.9 | 74.9 |
| Pressure | [barg] | 21.0 | 21.1 |
| Split (GPR1) | [%] | 48.2 | 47.8 |
| H2/C3 ratio | [mol/kmol] | 21.3 | 19.3 |
| C2/C3 ratio | [mol/kmol] | 53.4 | 58.0 |
| MFR (230° C./2.16 kg) | [g/10 min] | 1.3 | 1.3 |
| C2 content (calc.) | [wt %] | 6.5 | 6.6 |
| GPR 2 | | | |
| Temperature | [° C.] | 79.99 | 79.96 |
| Pressure | [barg] | 16.03 | 14.97 |
| Split (GPR2) | [%] | 18.2 | 19.5 |
| C2/C3 ratio | [mol/kmol] | 401 | 432 |
| H2/C3 ratio | [mol/kmol] | 69 | 76 |
| MFR (230° C./2.16 kg) | [g/10 min] | 1.2 | 1.1 |
| XCS | [wt %] | 35.3 | 39.2 |
| C2 (content calc.) | [wt %] | 10.5 | 11.3 |

b) Preparation of the Polypropylene Compositions

In a first approach the heterophasic propylene copolymer powders A1 and A2 from the polymerization reaction were compounded in a twin screw extruder together with different stabilizer packages to obtain the polypropylene compositions of examples CE1, IE1, IE2, IE3 and IE4.

Depending on the accordant polypropylene composition different alpha-nucleating agents were added.

The compositions of examples IE2 to IE4 were vis-broken to a melt flow rate $MFR_2$ (230° C., 2.16 kg) of 3.8-3.9 g/10 min as disclosed in the example section of WO 2017/198633.

An overview of the production of the polypropylene compositions of examples CE1, IE1, IE2, IE3 and IE4 are shown in Table 2.

TABLE 2

Compounding of CE1, IE1, IE2, IE3 and IE4in a twin screw extruder:

| | | CE1 | IE1 | IE2 | IE3 | IE4 |
|---|---|---|---|---|---|---|
| HECO-powder | | A1 | A1 | A1 | A2 | A2 |
| Visbreaking | | no | no | yes | yes | yes |
| Stabiliser onepack 1 | [wt %] | 0.2 | 0.2 | — | — | — |
| Stabiliser onepack 2 | [wt %] | — | — | 0.14 | 0.14 | — |
| Stabiliser onepack 3 with alpha-NA DMDBS | [wt %] | — | — | — | — | 0.38 |
| Alpha-NA BNT | [wt %] | — | 2.0 | 2.0 | 2.0 | — |
| Temperature ranges of extruder zones | [° C.] | 140-300 | 140-300 | 150-280 | 140-280 | 140-280 |
| Specific Energy Input (SEI) | kWh/kg | 0.155 | 0.157 | 0.146 | 0.150 | 0.147 |
| Polymer melt temp. at melt pump | [° C.] | 244 | 242 | 231 | 234 | 234 |

In second approach the compounded pellets of comparative example CE1 were compounded in a second compounding step in a Buss 100 MDK L/D 11 D co-kneader together with different alpha-nucleating agents to obtain the polypropylene compositions of examples CE2, IE5 and IE6.

An overview of the production of the polypropylene compositions CE2, IES and IE6 are shown in Table 3.

TABLE 3

Compounding of CE2, IE5 and IE6 in a Buss 100 MDK L/D 11D co-kneader:

| | | CE2 | IE5 | IE6 |
|---|---|---|---|---|
| Pellets | | CE1 | CE1 | CE1 |
| Alpha-NA DMDBS | [wt %] | — | 0.2 | — |
| Alpha-NA NX8000 | [wt %] | — | — | 0.4 |
| Mixer zones temperature settings | [C.] | 150-200 | 160-200 | 150-200 |
| Mixer RPM | | 150 | 150 | 150 |
| Specific Energy Input SEI | [kWh/kg] | 0.29 | 0.28 | 0.28 |

Stabilizer Packages and Alpha-Nucleating Agents:

Stabiliser onepack 1 consists of 21.8 wt % Pentaerythrityl-tetrakis(3-(3',5'-di-tert. butyl-4-hydroxyphenyl)-propionate (CAS-No. 6683-19-8), 43.6 wt % Tris(2,4-di-t-butylphenyl) phosphite (CAS-No. 31570-04-4) and 34.6 wt % Calcium stearate (CAS-No. 1592-23-0), all commercially available from a variety of companies.

Stabiliser onepack 2 consists of 29 wt % Pentaerythrityl-tetrakis(3-(3',5'-di-tert. butyl-4-hydroxyphenyl)-propionate (CAS-No. 6683-19-8), 58 wt % Tris(2,4-di-t-butylphenyl) phosphite (CAS-No. 31570-04-4) and 13 wt % Magnesium Oxide (CAS-No. 1309-48-4), all commercially available from a variety of companies.

Stabiliser onepack 3 consists of 15.6 wt % Pentaerythrityl-tetrakis(3-(3',5'-di-tert. butyl-4-hydroxyphenyl)-propionate (CAS-No. 6683-19-8), 15.6 wt % Tris(2,4-di-t-butylphenyl) phosphite (CAS-No. 31570-04-4), 15.6 wt % Calcium stearate (CAS-No. 1592-23-0) and 53.2 wt % alpha-nucleating agent 1,3:2,4 Bis(3,4-dimethylbenzylidene) sorbitol (DMDBS, CAS-No. 135861-56-2), all commercially available from a variety of companies.

Alpha-nucleating agent DMDBS (1,3:2,4 Bis(3,4-dimethylbenzylidene) sorbitol, CAS-No. 135861-56-2) is commercially available from a variety of companies.

Alpha-nucleating agent Millad NX8000, 1,2,3-trideoxy-4,6:5,7-bis-O-((4-propylphenyl) methylene) nonitol (CAS-No. 882073-43-0), is commercially available from Milliken Chemical Company.

Alpha-nucleation via BNT was achieved by adding 2 wt % of a propylene homopolymer with an MFR2 (230° C.) of 8.0 g/10 min and a melting temperature of 162° C., which is produced with a Ziegler-Natta type catalyst in the Borealis nucleation technology (BNT), comprising a polymeric α-nucleating agent, and is distributed by Borealis AG (Austria).

The polypropylene compositions CE1-CE2 and IE1-IE6 show the properties as listed below in Table 4 and Table 5.

TABLE 4

Properties of polypropylene compositions CE1, IE1-IE4:

| | | CE1 | IE1 | IE2 | IE3 | IE4 |
|---|---|---|---|---|---|---|
| HECO powder | | A1 | A1 | A1 | A2 | A2 |
| alpha-NA | | no | BNT | BNT | BNT | DMDBS |
| $MFR_2$ | [g/10 min] | 1.2 | 1.3 | 3.9 | 3.8 | 3.8 |
| Flexural modulus | [MPa] | 335 | 370 | 378 | 361 | 351 |
| Charpy NIS (−20° C.) | [kJ/m$^2$] | 6.3 | 6.5 | 4.2 | 5.2 | 6.8 |
| Charpy NIS (23° C.) | [kJ/m$^2$] | 83.9 | 83.6 | 78.9 | 77.7 | 79.2 |
| Tm | [° C.] | 148.9 | 146.6 | 147.4 | 147.1 | 149.2 |
| Tc | [° C.] | 95.7 | 113.6 | 114.5 | 112.4 | 119.5 |
| Tm − Tc | [° C.] | 53.2 | 33.0 | 32.9 | 34.7 | 29.7 |
| C2 (total) | [wt %] | 12.4 | 12.4 | 11.3 | 12.5 | 13.6 |
| $V_{int}$ (total) | [cm$^3$/g] | 277 | 268 | 213 | n.m. | n.m. |

TABLE 4-continued

Properties of polypropylene compositions CE1, IE1-IE4:

| | | CE1 | IE1 | IE2 | IE3 | IE4 |
|---|---|---|---|---|---|---|
| XCS fraction | [wt %] | 35.6 | 34.7 | 35.6 | 37.4 | 40.3 |
| C2 (XCS) | [wt %] | 26.1 | 26.3 | 24.5 | 25.0 | 26.0 |
| $V_{int}$ (XCS) | [$cm^3/g$] | 251 | 243 | 189 | 194 | 202 |
| Mw (XCS) | [g/mol] | 294,500 | 285,000 | 215,000 | 211,500 | 219,000 |
| Mn (XCS) | [g/mol] | 45,650 | 45,400 | 48,900 | 50,700 | 44,850 |
| PDI (Mw/Mn) (XCS) | [—] | 6.4 | 6.3 | 4.4 | 4.2 | 4.9 |
| XCI fraction | [wt %] | 64.4 | 65.3 | 64.4 | 62.6 | 59.7 |
| C2 (XCI) | [wt %] | 4.8 | 5.5 | 5.8 | 5.5 | 6.6 |
| $V_{int}$ (XCI) | [$cm^3/g$] | 286 | 275 | 216 | 217 | 212 |
| Mw (XCI) | [g/mol] | 384,500 | 372,500 | 271,000 | 273,000 | 271,500 |
| Mn (XCI) | [g/mol] | 69,500 | 68,100 | 62,000 | 59,250 | 60,050 |
| PDI (Mw/Mn) (XCI) | [—] | 5.5 | 5.5 | 4.4 | 4.6 | 4.5 |
| $V_{int}$ ratio (XCI/XCS) | [—] | 1.14 | 1.13 | 1.14 | 1.12 | 1.05 |
| Mw ratio (XCI/XCS) | [—] | 1.31 | 1.31 | 1.26 | 1.29 | 1.24 |

TABLE 5

Properties of polypropylene compositions CE1, IE5 and IE6:

| | | CE2 | IE5 | IE6 |
|---|---|---|---|---|
| pellets | | CE1 | CE1 | CE1 |
| alpha-NA | | No | DMDBS | NX8000 |
| $MFR_2$ | [g/10 min] | 1.4 | 1.4 | 1.4 |
| Flexural modulus | [MPa] | 351 | 390 | 428 |
| Charpy NIS (−20° C.) | [$kJ/m^2$] | 4.5 | 5.0 | 4.2 |
| Charpy NIS (23° C.) | [$kJ/m^2$] | 79.9 | 79.3 | 77.2 |
| Tm | [° C.] | 149.9 | 148.4 | 151.8 |
| Tc | [° C.] | 97.4 | 119.0 | 123.2 |
| Tm-Tc | [° C.] | 52.5 | 29.4 | 28.2 |

n.m. = not measured

3. Production of 10 kV Cables 10 kV test cables were produced on a Maillefer pilot cable line of catenary continuous vulcanizing (CCV) type.

The conductors of the cable cores had a cross section being 50 $mm^2$ of stranded aluminium and had a cross section of 50 $mm^2$. The inner semiconductive layer was produced from either semiconductive compositions SC1, SC2 or SC3 as described below and had a thickness of 1.0 mm. The insulation layer was produced from the above described compositions C1 and CE2 and IE1 to IE6, and had a thickness of 3.4 mm. The inner semiconductive layer was produced from either semiconductive compositions SC1, SC2 or SC3 as described below and had a thickness of 1.0 mm. The cables, i.e. cable cores, were produced by extrusion via a triple head. The insulation extruder had size 100 mm, the extruder for conductor screen (inner semiconductive layer) 45 mm, and the extruder for insulation screen (outer semiconductive layer) 60 mm. The line speed was 6.0 m/min.

The vulcanisation tube had a total length of 52.5 meter consisting of a curing section followed by a cooling section. The curing section was filled with $N_2$ at 10 bar but not heated. The 33-meter-long cooling section was filled with 20-25° C. water.

The pilot cables were then subjected to AC breakdown testing.

Semiconductive layer 1 (SC1) was prepared from ready-to-use semiconductive composition Borlink LE7710, which is a non-crosslinkable polyethylene based composition comprising carbon black, commercially available from Borealis AG.

Semiconductive layer 2 (SC2) was prepared from 66.5 wt % of the polypropylene based composition of CE1 with 33.0 wt % of carbon black Printex Alpha, commercially available from Orion Engineered Carbons GmbH, and 0.5 wt % of maleic anhydride grafted propylene homopolymer Exxelor PO1020 having a melt flow rate at 230° C. and a load of 2.16 kg of 430 g/10 min, commercially available from Exxon-Mobil.

Semiconductive layer 3 (SC3) was prepared from 70 wt % of the polypropylene based composition of IE3 with 30.0 wt % of carbon black Printex Alpha, commercially available from Orion Engineered Carbons GmbH.

Table 6 shows the electric properties of the 10 kV cables of examples C1-C8 in which the inventive insulation layers IE1-IE6 are compared to comparative insulation layer CE1 and CE2.

TABLE 6

| Electric properties of 10 kV cables of C1-C8 | | | | | | | | |
|---|---|---|---|---|---|---|---|---|
| | C1 | C2 | C3 | C4 | C5 | C6 | C7 | C8 |
| Insulation layer | CE1 | IE1 | IE2 | IE3 | IE4 | CE2 | IE5 | IE6 |
| Inner semic. layer | SC1 | SC1 | SC2 | SC3 | SC3 | SC2 | SC2 | SC2 |
| Outer semic. layer | SC1 | SC1 | SC1 | SC3 | SC3 | SC1 | SC1 | SC1 |
| Weibull-alpha (scale) [kV/mm] | 48.7 | 47.0 | 50.8 | 48.1 | 44.6 | 43.8 | 46.7 | 47.6 |
| Weibull-beta (shape) | 7.0 | 9.3 | 8.9 | 35.0 | 19.0 | 6.4 | 14.4 | 17.5 |

It can be seen that all test cables C1 to C8 show good dielectric properties as regards the Weibull-alpha parameter. When comparing C1 with C2 to C5 and C6 with C7 and C8 it can be seen that introduction of an alpha-nucleating agent (BNT, DMDBS or Millad NX8000) increases the Weibull-beta parameter.

The invention claimed is:

1. A polypropylene composition comprising:

(A) a copolymer of propylene and comonomer units selected from ethylene and alpha-olefins having from 4 to 12 carbon atoms with a total amount of comonomer units of from 10.0 to 16.0 wt %, based on the total amount of monomer units in the polypropylene composition, and (B) an alpha-nucleating agent;

wherein the polypropylene composition has a xylene cold soluble (XCS) fraction in a total amount of from 25.0 to 50.0 wt %, based on the total weight amount of the polypropylene composition, with an amount of comonomer units of at least 23.0 wt %, based on the total amount of monomer units in the xylene cold soluble (XCS) fraction, a melt flow rate $MFR_2$ of from 0.5 to 5.0 g/10 min, determined according to ISO 1133 at 2.16 kg and 230° C., and a flexural modulus of not more than 470 MPa.

2. The polypropylene composition according to claim 1, wherein the xylene cold solubles (XCS) fraction has an intrinsic viscosity of from 150 to 350 $cm^3/g$, measured in decalin.

3. The polypropylene composition according to claim 1, having a fraction insoluble in cold xylene (XCI) with an amount of comonomer units of from 3.0 to 9.0 wt %, based on the total amount of monomer units in the fraction insoluble in cold xylene (XCI).

4. The polypropylene composition according to claim 1, wherein the copolymer of propylene and comonomer units selected from ethylene and alpha-olefins having from 4 to 12 carbon atoms is a heterophasic copolymer of propylene which comprises a matrix phase and an elastomeric phase dispersed in said matrix phase, which comprises two glass transition temperatures attributed to the matrix phase and the elastomeric phase, wherein the glass transition temperature attributed to the matrix phase Tg (matrix) is in the range of from −1.0 to −15.0° C., and/or the glass transition temperature attributed to the elastomeric phase Tg (EPR) is in the range of from −40.0 to −55.0° C.

5. The polypropylene composition according to claim 1, having a melting temperature Tm of from 140 to 159° C.

6. The polypropylene composition according to claim 1, having a crystallization temperature Tc of from 105 to 130° C.

7. The polypropylene composition according to claim 1, having a Charpy notched impact strength at −20° C. of at least 3.5 $kJ/m^2$.

8. The polypropylene composition according to claim 1, having a Charpy notched impact strength at 23° C. of at least 70.0 $KJ/m^2$.

9. The polypropylene composition according to claim 1, having a melt flow rate $MFR_2$ of from more than 0.5 to 2.5 g/10 min.

10. The polypropylene composition according to claim 1, having a melt flow rate $MFR_2$ of from more than 2.5 to 5.0 g/10 min.

11. The polypropylene composition according to 10, wherein the polypropylene composition has been subjected to vis-breaking.

12. The polypropylene composition according to claim 1, being free of a dielectric fluid.

13. An article comprising the polypropylene composition according to claim 1, comprising an insulation layer comprising the polypropylene composition.

14. The article according to claim 13, being a cable comprising an insulation layer comprising the polypropylene composition and having a Weibull alpha-value of at least 35 kV/mm—and/or a Weibull beta-value of at least 7.5, measured on a 10 kV cable.

15. The article according to claim 13, wherein the polypropylene composition is a cable insulation for medium and high voltage cables.

16. The polypropylene composition according to claim 1, wherein the xylene cold soluble (XCS) fraction has an amount of comonomer units of 23.0 to 35.0 wt %, based on the total amount of monomer units in the xylene cold (XCS) soluble fraction.

* * * * *